United States Patent

[11] 3,583,209

[72] Inventor William B. Banks
 Houston, Tex.
[21] Appl. No. 802,996
[22] Filed Feb. 27, 1969
[45] Patented June 8, 1971
[73] Assignee Automation Products, Inc.
 Houston, Tex.

[54] METHOD OF AND APPARATUS FOR MEASURING MASS OF A MATERIAL
12 Claims, 2 Drawing Figs.

[52] U.S. Cl. ................................................. 73/32,
 73/432, 73/67.2
[51] Int. Cl. .................................................. G01n 9/00
[50] Field of Search .......................................... 73/32, 433,
 434, 436, 30, 432 (PS), 28, 57, 59, 61, 61.2, 61.4,
 67.2; 324/71; 210/19; 55/15, 277

[56] References Cited
UNITED STATES PATENTS
| 2,943,476 | 7/1960 | Bernstein | 73/32 |
| 3,270,563 | 9/1966 | Sharples | 73/432 |
| 3,339,400 | 9/1967 | Banks | 73/32 |
| 3,463,727 | 8/1969 | Fahey | 210/19 |

Primary Examiner—Richard C. Queisser
Assistant Examiner—Ella J. Koch
Attorneys—James F. Weiler, Jefferson D. Giller, William A. Stout, Paul L. De Verter, II, Dudley R. Dobie, Jr. and Henry W. Hope ABSTRACT: A method of and apparatus for measuring the mass of a material in a fluid by use of a vibratory U-shaped hollow body, and more particularly measuring the total mass of a material in a fluid and measuring the amount of different sized material particles. Supporting the legs of a U-shaped body adjacent the node points of its resonant frequency and flowing a fluid containing the material to be measured through the body, vibrating the body and measuring the vibration of the body while the fluid is flowing through the body whereby the vibration of the body is a measure of the mass of the material in the fluid, stopping the fluid flow through the body and allowing the material to be separate from the fluid and accumulate in the U-shaped end, and measuring the vibration body while the material separates which measurement is the measure of the particle distribution of the material. Measuring the vibration after the material has separated from the fluid which provides a measurement of the total mass of the material in the fluid. A hollow U-shaped sensing element vertically positioned supported about its legs, electromagnetic vibration drive means and vibration measuring means connected to the sensing element at a position spaced from the support means and adjacent the node point of the sensing element in which the mass of the support means is greater than the sensing element and the electromagnetic drive and measuring means and containers connected to each leg of the body and having tapered connections to the legs.

PATENTED JUN 8 1971

3,583,209

William B. Banks
INVENTOR.

BY James F. Weiler
William A. Stout
ATTORNEYS

METHOD OF AND APPARATUS FOR MEASURING MASS OF A MATERIAL

BACKGROUND OF THE INVENTION

While devices such as pycnometers have been used to measure the density of unknown material, and while other complicated, expensive and time consuming apparatus and methods have been used to determined the amount of various size particulate material in a fluid, the present invention is directed to simplified method and apparatus for determining the mass or density of a material in a fluid, and if desired, the size of and the volume of various size particles in a fluid.

SUMMARY

The present invention is directed to a method of measuring a material in a fluid by the use of vibratory U-shaped body through which the fluid is flowed, and also measuring the particle size distribution of the materials in the fluid by stopping the flow of fluid through the body whereby the material to be measured will separate from the fluid and accumulate in U-shaped end of the body in which the rate of change of vibration of the body is a measure of the particle size distribution of the material.

The invention is further directed to providing a more sensitive measurement of the total mass or density of the material in the fluid by vibration of the U-shaped body after the material has separated from the fluid and accumulated in the U-shaped end of the body.

The present invention is also directed to providing an apparatus for measuring mass of a material by providing a vibrating hollow U-shaped sensing element vertically positioned with support means supporting the element about its legs, and having electromagnetic vibration drive and measuring means connected to and supported from the sensing elements at a point spaced from the support means and with the mass of the support means being greater than the element and the electromagnetic means, and providing additional sensitivity by providing a large container connected to each leg of the body which have a tapered connection to the legs.

DESCRIPTION OF THE PREFERRED EMBODIMENT

Figures 1, 2:
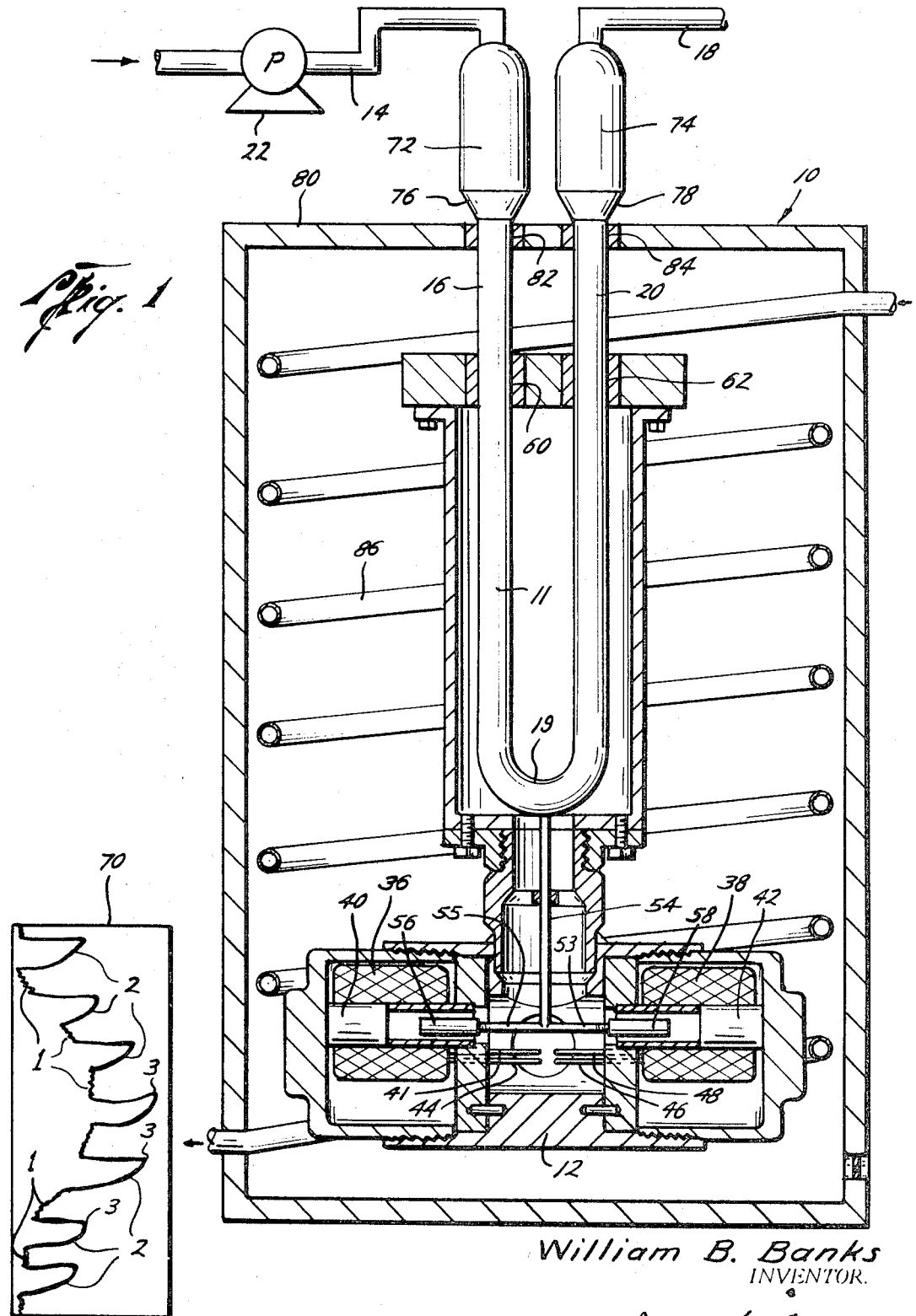
FIG. 1 is an elevational view partly in cross section, illustrating one embodiment of the invention.
FIG. 2 is a graph of a chart illustrating a typical readout from the apparatus of FIG. 1.

One of the features of the present invention is the method of measuring the mass of a material in a fluid by placing the material in the fluid in a vibrating U-shaped hollow body which is vertically positioned. The material will separate from the fluid and accumulate in the U-shaped end of the hollow body whereby the total mass of the material and/or particle size distribution of the material can be determined. My earlier patent numbers, U.S. Pat. Nos. 3,320,791; 3,339,400; 3,385,104 and my copending application Ser. No. 567,217 now U.S. Pat. No. 3,449,940 are directed to vibratory U-shaped bodies for determining mass, and the structures therein described can generally be utilized to practice the present method.

By example only, the present method and apparatus will be described in connection with its use as sampling river water to measure the sediment therein for determining the total solid content thereof, and the particle size distribution, that is, the sizes and amounts of the particles in the fluid.

Referring now to FIG. 1, the reference numeral 10 generally designates the apparatus according to the present invention. The apparatus 10 generally includes, as described in my above-mentioned patents, a hollow U-shaped sensing element 11 through which fluid being measured is flowed. Thus, an inlet pipe 14 is connected to one of the legs 16 of the body 11 and an outlet pipe 18 is connected to and receives the outlet from the other leg 20 of the body 11. A pump 22 is provided for pumping fluid through the body 11 when desired.

Means are provided for vibrating the body 11 and means are provided for measuring the vibration of the body 11 which is a measure of the density or mass of the fluid therein. The electromagnetic vibration drive means may be enclosed in a case 12 and generally includes a magnetic coil 36, a magnetic core 40, electrical connections 41 and 44 which supply electrical current from an external source to the electromagnetic coil 36 which sets up vibrations in a vibratory armature 56 which is connected to arm 55 of a rod 54 which in turn is connected to and vibrates the hollow U-shaped body 11, of the applied external source at the frequency, preferably the natural resonant frequency of the body 11 for greater sensitivity.

The electromagnetic sensing measuring means is also located in the housing 12 and generally includes a magnet 42, electromagnetic coil 38 which is connected to the electrical connections 46 and 48 which carries the signal generated in the detecting coil 38 to any suitable indicating device such as a volt meter or readout such as a chart 70 shown in FIG. 2. Rod 54 also includes an arm 53 which supports a magnetic armature 58 at its end which vibrates and induces a voltage in coil 38 indicative of the amount of vibration of the body 11. Rod 54 may be connected to the body 11 to vibrate the body 11 in any direction. While it is preferable to vibrate the body 11 perpendicular to a plane containing the legs 16 and 20 for convenience of the drawing, as shown in FIG. F1, the body is being vibrated in a plane containing both legs 16 and 20 of the body 11.

The housing 12 is connected to and supported from the U-shaped body 11 at points 60 and 62 which are preferably adjacent the node points of the natural resonant frequency of the body 11 about these points. Thus, when the armature 56 is vibrated in response to an electrical signal, the body 11 and the material passing through the body will vibrate in accordance with that signal. Furthermore, the vibrating armature 58 will also vibrate in response to the vibration of the body 11 and induce a signal in the electrical conductors 46 and 48 which is proportional to the amount of vibration of the body 11. The density of the material flowing through the U-shaped body 11 is thus continuously measured to note the value or change in value of the mass of density of the material in the body 11.

The above described structure is generally shown in my aforementioned patents. Thus a vibrating U-shaped body 11 will measure the mass or density of the fluid therein. If the variable to be measured is the solids content or sediment in river water (or any other unknown mass of material in a fluid) than any change in the measurement of the density of the total fluid flowing through the body 11 is attributable to the change in the mass or the total solids content of the sediment in the water since the water density is constant. However, greater sensitivity can be obtained if the total solids content for a particular volume of fluid could be accumulated at the U-shaped end 19 of the body 11 as it would have more effect at that position on the vibration of the body 11. Therefore, if the body 11 is operated in a vertical position with the U-shaped end 19 positioned below the legs 16 and 20 and the pump 22 is stopped, the solids content in the fluid will drop out of the water by gravity and accumulate in the U-tube end 19 and will provide an extremely sensitive and accurate measure of the total solids content of the fluid.

In addition, another valuable measurement that can be made from the vibratory vertically positioned U-shaped body 11 is the measurement of the particle size and distribution of the particles in the fluid. According to Stokes Law, the larger or heavier particles will settle out or fall out of the fluid first. Thus a measurement, while the material particles are settling out of the fluid will provide a measurement of the particle size and distribution of the various sized particles of the fluid. That is, the measurement of the vibration of the body 11 is continued after the pump 22 is stopped and while the material particles separate from the fluid.

Referring now to the chart 70 in FIG. 2 a graph is shown having sections numbered 1 and 2. Sections number 1 represents the measurement of a typical operating condition when the pump 22 of FIG. 1 is running, the chart speed is 1 inch per hour and the scale is 0 to 25,000 parts per million by weight. This particular operation condition is utilized when the material in the fluid such as the sediment in river water is particularly high and is an indication of the total solids in the fluid. Graph sections 2 are under conditions in which the pump 22 is stopped, and the material is in the process of separating out of the fluid and in which the chart speed is 1 inch per minute and the scale is 0 to 500 parts per million by weight. Thus, the rate of change in the sections 2 of the chart is a measure of the particle size and distribution which is evident as the initial portions of the curve 2 is much flatter than the terminal portions as would be expected as the heavier particles separate out of the fluid first and accumulate in the U-shaped end 19 of the tube 11 and as the rate changes indicating the slower fallout of the smaller particles. Of course, after all of the particles have settled out of the fluid (curve 2 becomes constant), the amount of vibration of the body 11 will then be a very sensitive indication of the total solids content by weight in the fluid volume from which the solids separated. Thus, if the rate of change of a curved portion 2 remains constant (thereby indicating that the solids have separated from the fluid) then the amount of vibration of the body 11 is an indication of the total solids content such as indicated at points 3 on the chart, and is of course, a much more sensitive measurement since the solids being measured are then at the U-portion 19 of the tube 11, and concentrated at the point of maximum vibration.

In order to increase the total volume of fluid which is in vertical alignment with the legs 16 and 20 of the sensing element 11, containers 72 and 74 may be provided connected in the inlet and outlet lines 16 and 18, respectively. Containers 72 and 74 each include a tapered section 76 and 78, respectively, connected to the lines 16 and 20. Thus, the containers 72 and 74 provide a larger volume of fluid than only the U-tube 11 itself, and consequently a larger amount of material to be measured will settle out to the U-end 19 to provide a still more sensitive readout since the sample being measured is greater.

While the embodiment shown in FIG. 1 of a vibratory U-tube sensing element 11 is shown in position with the U-shaped end 19 below the legs 16 and 20, the U-end 19 will be positioned above the legs 16 and 20 in the event that the material to be measured is lighter than the fluid which would be particularly useful such as measuring the amount of gasoline or air in water. In this latter event the gasoline or air will separate itself from the fluid and rise to the top of the U-shaped end 19 and in this event the total amount of gasoline or air in the fluid per unit of fluid can be measured.

In some cases, the mass of the material desired to be measured in a fluid cannot be measured directly and will require a chemical reaction to separate the desired components to be measured from the fluid. For example, assuming that the fluid is a gas and it is desired to measure the amounts of sulfur dioxide therein, the sulfur dioxide is bubbled through a barium chloride solution, which reacts with the sulfur dioxide and forms barium sulfate, a solid, which settles out and can be measured.

As previously mentioned, while the structures of my prior patents and application can be generally utilized to perform the method of the present invention, the structure of the apparatus 10 shown in FIG. 1 is particularly advantageous for measuring fluid density or mass in that it may be connected in conventional process lines and then even though subjected to external conditions, such as shocks and vibrations, will not effect the sensitivity of the instrument. That is, the U-tube sensing element 11 and the electromagnetic vibration drive means and vibration measuring means which are supported at points 60 and 62 from the tube 11 are all supported from a base 80 which is connected to the sensing element legs 16 and 20 at points 82 and 84 which is spaced from the node points 60 and 62. Thus the electrical input and output signals are isolated from the support 80 which is a housing having a mass greater than that of the combined sensing element 11, and housing 12. Assuming a conventional operating condition in which the natural resonant frequency of the tube 11 about its node points 60 and 62 is 120 cycles per second and the natural resonant frequency of the housing 12 about the node points 60 and 62 is 5 cycles per second with the natural resonant frequency of the entire sensing element 11 and connected housing 12 about the points 82 and 84 being 5 cycles per second, then the transmissibility of the vibration signals from the support 80 through the section of tubing between the supports 80 the section of tubing between the supports 82, 84, and the node points 60 and 62 is small, and from a practical standpoint the electromagnetic vibration drive means and vibration measuring means will not be affected by external vibrations at the support 80 even if the external vibrations are at the operational frequency of 120 cycles per second.

In addition, the apparatus 10 may include heating lines such as steamlines 86 to maintain a constant temperature within the enclosure 80 to insure that the sensitivity of the instrument will not be affected by temperature.

In operation, the apparatus 10 is generally operated with the fluid containing the fluid to be measured flowing through the body 11 with the body being vibrated by the electromagnetic measuring means and the vibration being measured by the electromagnetic vibration measuring means. In this condition, as indicated in FIG. 2, the chart portion 1 will be a measure of the mass or density of the material in the fluid. Periodically, the pump 22 is stopped whereby the fluid flowing through the tube 11 is stopped and the material to be measured separates from the fluid and accumulates at the U-shaped end 19. Since the vibration drive and measurement means continues, the measurement being made as the material separates from the fluid, measures the particle size distribution of the material as indicated by chart portion 2 on the chart 70 in FIG. 2. And, of course, after the material has settled out, the measurement of the vibration of body 11 is a measurement of the total content of the material in the fluid as indicated at points 3 and is a much more sensitive measurement that the curve portion 1 on the chart.

The present invention, therefore, is well adapted to carry out the objects and attain the ends and advantages mentioned as well as others inherent therein.

What I claim is:

1. The method of measuring the mass of a material suspended in a fluid comprising, placing a U-shaped vibratory hollow body in a substantially vertical position, supporting the body by the legs adjacent the node points of the natural resonant frequency of the body;

placing the fluid containing the material to be measured in the body, allowing the material to be measured to separate from the fluid and accumulate in the U-shaped end of the hollow body, vibrating the body and the contents therein, measuring the vibration of the body after the material has separated whereby the vibration of the body is a measure of the mass of the material in the fluid.

2. The method of claim 1 including the steps of placing the fluid containing the material in the body by flowing the fluid through the U-shaped body, and periodically allowing the material to accumulate in the U-shaped end of the hollow body by periodically stopping the flow of fluid through the body.

3. The method of claim 1 including the step of subjecting the material to be measured to a chemical action and precipitating the material out of the fluid.

4. The method of measuring the mass of a material in a fluid comprising, placing a U-shaped vibratory hollow body in a substantially vertical position, supporting the body by the legs adjacent the node points of the natural resonant frequency of the body, placing the fluid containing the material to be measured in the body, allowing the material to be measured to separate from the fluid by gravity and accumulate in the U-shaped end of the hollow body, vibrating the body while separation of the material from the fluid is occuring, measuring the vibration of the body while the separation is occuring whereby the rate of change of vibration of the body is a measure of the particle size distribution of the material.

5. The method of claim 4, including the steps of placing the fluid containing the material in the body by flowing the fluid through the U-shaped body, and periodically measuring the particle size distribution of the material by periodically stopping the flow of fluid through the body.

6. The method of claim 4 including,
measuring the vibration of the body after the material has separated whereby the vibration of the body is a measure of the mass of the material in the fluid.

7. The method of claim 4 wherein the material to be measured is heavier than the fluid and the body is placed in position with the U-shaped end at the bottom.

8. An apparatus for measuring the mass of a material comprising, a hollow U-tube sensing element vertically positioned, support means for supporting said element about its legs, electromagnetic vibration drive means including first and second members, the first of which is connected to the sensing element for vibrating said sensing element, electromagnetic vibration measuring means including first and second members, the first of which is connected to said sensing element for measuring the vibration of said sensing element, said vibration drive means second member and said vibration measuring means second member being secured to and supported from the support means and adjacent a node point of the sensing element, the mass of the support means being greater than the mass of said sensing element, drive means and measuring means.

9. The apparatus of claim 8 including, an enlarged container connected to each of the legs of said body and having a tapered connection to the legs.

10. The apparatus of claim 8 wherein the U-shaped end is positioned below the legs of the body.

11. An apparatus for measuring the mass of a material comprising, a hollow U-tube sensing element vertically positioned, support means for supporting said element about its legs, electromagnetic vibration drive means including first and second members, the first of which is connected to the sensing element for vibrating said sensing element, electromagnetic vibration measuring means including first and second members, the first of which is connected to said sensing element for measuring the vibration of said sensing element, said vibration drive means second member and said vibration measuring means second member being secured to and supported from the sensing element at a position spaced from the support means and adjacent a node point of the sensing element, and the natural resonant frequency of the U-tube sensing element about the support means being lower than the natural resonant frequency of the U-tube about said node point thereby reducing the transmissibility of vibration signals through the sensing element.

12. The apparatus of claim 11 wherein
said vibration drive means first member and said vibration measuring means first member are connected to the sensing element adjacent the U-shaped end.